Dec. 10, 1929.  A. BAUCHERE ET AL  1,739,383
MANUFACTURE OF CEMENTS
Filed Nov. 10, 1924  3 Sheets-Sheet 3

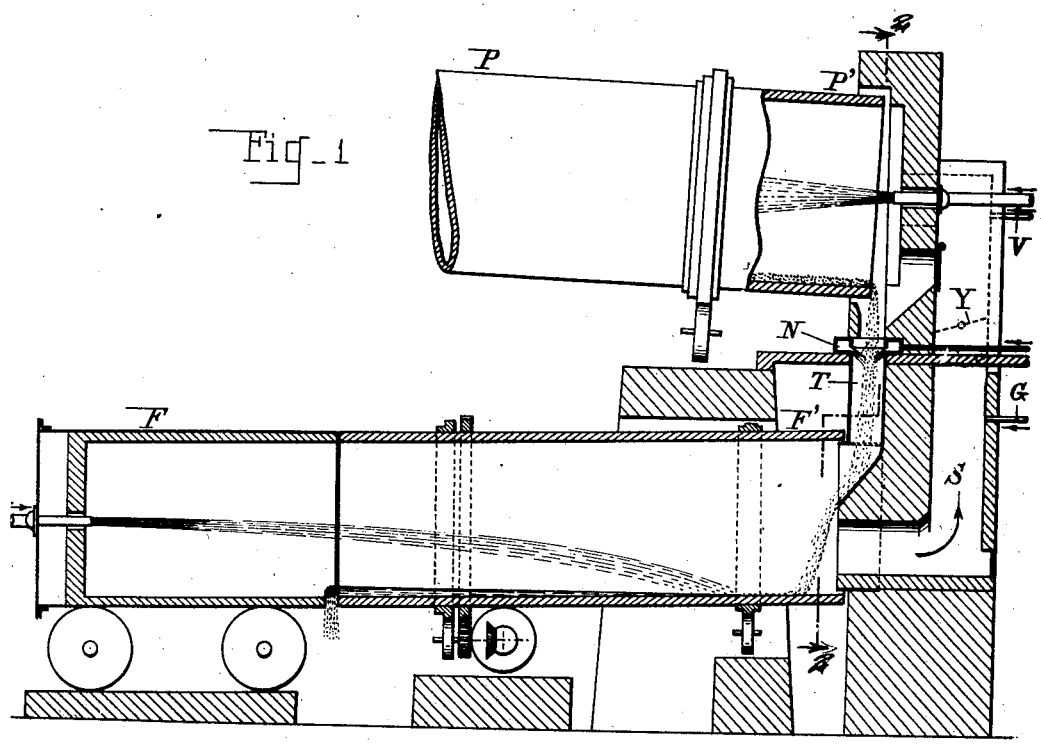

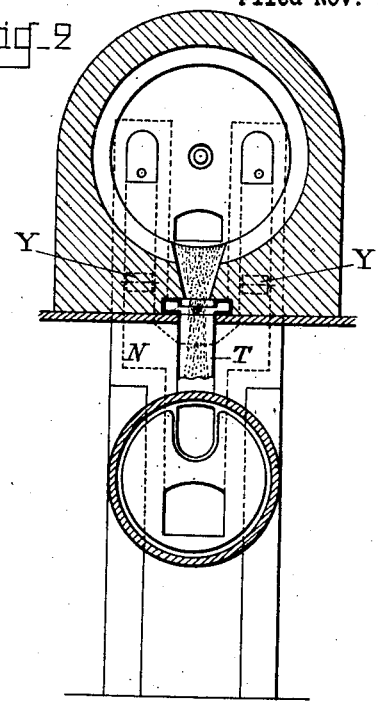
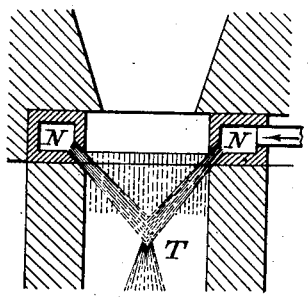
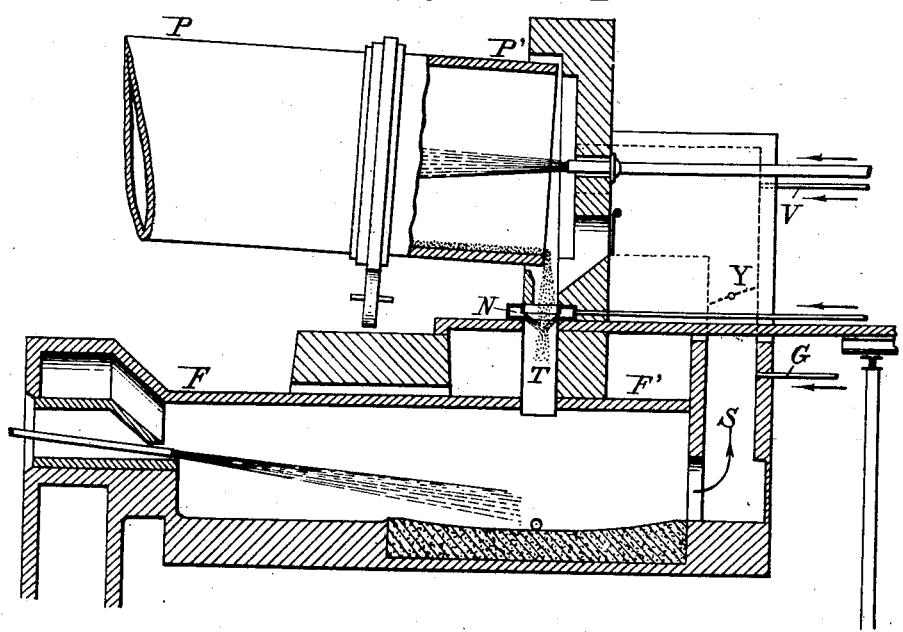

Inventors
A. Bauchere
G. Arnou
by Langner Parry Card & Langner
Attys.

Patented Dec. 10, 1929

1,739,383

UNITED STATES PATENT OFFICE

ANTOINE BAUCHÈRE AND GABRIEL ARNOU, OF PARIS, FRANCE

MANUFACTURE OF CEMENTS

Application filed November 10, 1924, Serial No. 748,993, and in France December 4, 1923.

This invention relates to the manufacture of fused cement.

It is already generally known that the whole series of artificial cements can be obtained by fusion.

Those cements, however, the fusion point of which is very high can be obtained only by means of an electric furnace, but as regards the others the ordinary kilns used in the industry may be employed by adopting special arrangements.

The object of this invention is to provide means in an apparatus intended for the manufacture of fused cement wherein the operation of fusion is effected in two periods and in two separate kilns, for preventing access of the high heat of the fusing kiln to the preparatory kiln, and thus avoiding fusing part of the materials in the preparatory kiln, which ordinarily causes the formation of an obstructing ring or elevation of material in the partially fused or pasty state, between the two kilns.

In the first period the material is prepared. The kiln employed for this purpose is generally a rotary kiln of which the temperature may be regulated at will for the operation to be effected therein.

In the second period the fusion is carried out.

The kiln employed for this purpose may be a rotary kiln, a fixed cylindrical kiln, a reverberatory kiln or generally any suitable kiln or fusion apparatus.

The apparatus of the present invention must allow of:

(1) Operation under low pressure in the preparatory kiln and under pressure in the fusion kiln, which is relatively higher than in the preparatory kiln.

(2) The temperature control of the products of combustion passing from the fusion kiln before their entrance into the preparatory kiln.

(3) The prevention of the gases of the fusion kiln from entering the preparatory kiln by the same opening as serves for the passage of the material from the preparatory kiln into the fusion kiln.

This latter condition is essential for preventing stoppages and obstructions.

This may be done more particularly by surrounding the conduit through which the material passes with a circular pipe containing compressed air. This air is introduced into the conduit through suitable openings in downwardly convergent jets so as to completely prevent the passage of the gas from the fusion kiln into the preparatory kiln.

The invention will now be more particularly described with reference to the accompanying drawings, in which three arrangements hereinbefore mentioned are illustrated, and in which:

Figures 1 and 2 are views in longitudinal and transverse sectional elevation of a rotary preparatory kiln combined with a rotary fusion kiln.

Figure 3 is a detail on an enlarged scale of a feed for the injection of compressed air.

Figure 5 shows in longitudinal section a rotary preparatory kiln combined with a reverberatory fusion kiln.

Figure 4:
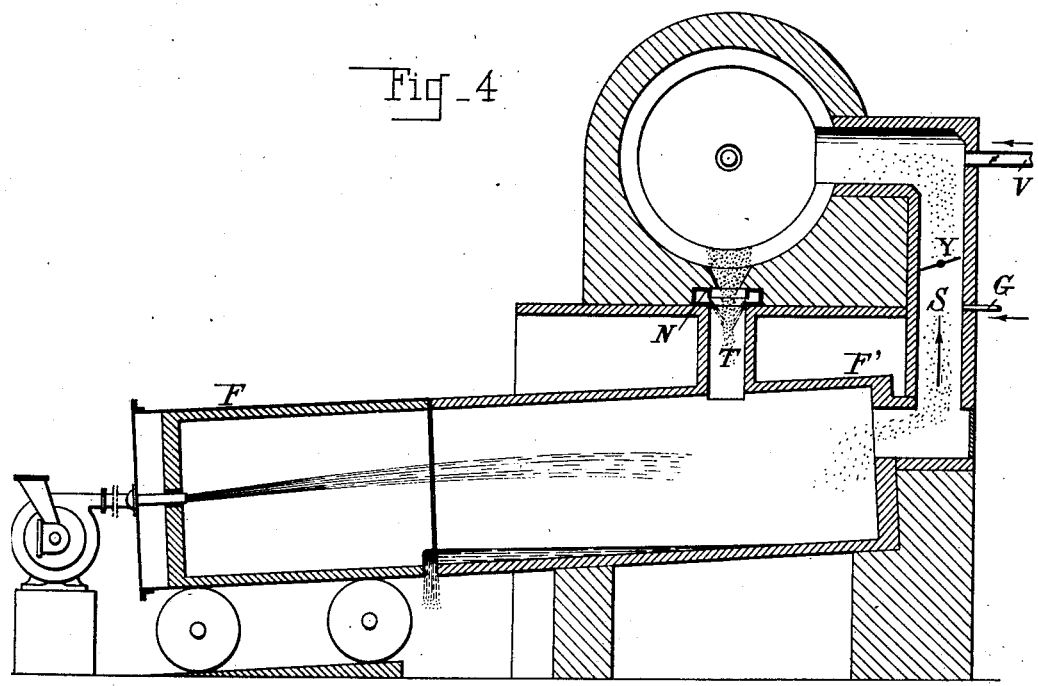
Figure 4 illustrates in vertical section a rotary preparatory kiln combined with a fixed cylindrical fusion kiln (drawn for convenience sake at right angles to the preparatory kiln).

Referring to these drawings:

PP' represents the preparatory kiln,

FF' the fusion kiln,

T the pipe for the passage of materials from the preparatory to the fusion kiln.

N the ring containing compressed air which when forced into the pipe T prevents gas from passing from the fusion kiln into the preparatory kiln by this pipe.

S the pipe allowing the passage of gas from the fusion kiln into the preparatory kiln.

V an aperture for the air which cools the gases coming from the fusion kiln and entering the preparatory kiln.

Y valve or damper enabling the fusion kiln to be maintained under pressure so that no re-admission of air can take place through the grouting hole.

G a cold air port.

It is evident that in these various arrangements the passage of the products of combustion from the fusion kiln into the preparatory kiln takes place by means of a pipe independent of the one through which the materials treated pass from the preparatory kiln into the fusion kiln.

By this means fusion of the materials treated, before their arrival in the fusion kiln, is prevented.

It must be noted that the present invention is not limited merely to the forms of construction illustrated in the accompanying drawings but that it covers all the modifications wherein the pipe carrying the gases from the fusion kiln into the preparatory kiln is independent of the one by which the material travels in the opposite direction. Thus for example, the compressed air injection ring may be replaced by any other suitable air injection apparatus and the pressure in the fusion kiln and the cooling of the fumes between the two kilns may be obtained by any other suitable means than by the dampers and by the admission of cold air respectively.

Having now particularly described and ascertained the nature of our said invention and in what manner the same is to be performed, we declare that what we claim is:

1. Apparatus for the production of fused cement comprising an inclined rotary preheating furnace and fusion furnace, means for heating said fusion furnace to a temperature above the fusion point of the cement materials, a conduit for passing the solid materials from the preheating furnace to the fusion furnace and means associated with said conduit to prevent the escape of gases of combustion from said fusion furnace to said conduit, said associated means comprising a supply of fluid under pressure arranged and adapted for discharging said fluid into the said conduit in the general direction of flow of the cement materials.

2. Apparatus as claimed in claim 1 the fluid under pressure being air.

3. Apparatus as claimed in claim 1 the fluid being at a sufficiently low temperature to maintain the materials below their point of fusion during all of the duration of their passage through said conduit.

In testimony whereof we have signed our names to this specification.

ANTOINE BAUCHÈRE.
GABRIEL ARNOU.